US011763706B2

(12) United States Patent
Covell et al.

(10) Patent No.: US 11,763,706 B2
(45) Date of Patent: Sep. 19, 2023

(54) DYNAMIC ADJUSTMENT OF PARALLEL REALITY DISPLAYS

(71) Applicant: International Business Machines Corporation, Armonk, NY (US)

(72) Inventors: Jacob Thomas Covell, New York, NY (US); Nicholas Bokun, Stratford, NJ (US); Thomas Jefferson Sandridge, Tampa, FL (US); Caroline Gaeta, Holmdel, NJ (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/349,999

(22) Filed: Jun. 17, 2021

(65) Prior Publication Data

US 2022/0406232 A1    Dec. 22, 2022

(51) Int. Cl.

| | |
|---|---|
| *G09G 3/00* | (2006.01) |
| *G10L 15/18* | (2013.01) |
| *G06N 3/08* | (2023.01) |
| *G06V 10/56* | (2022.01) |
| *G06V 20/40* | (2022.01) |
| *G06V 40/20* | (2022.01) |
| *H04N 13/351* | (2018.01) |
| *G06F 18/24* | (2023.01) |

(52) U.S. Cl.
CPC ............. *G09G 3/001* (2013.01); *G06F 18/24* (2023.01); *G06N 3/08* (2013.01); *G06V 10/56* (2022.01); *G06V 20/46* (2022.01); *G06V 40/20* (2022.01); *G10L 15/18* (2013.01); *H04N 13/351* (2018.05)

(58) Field of Classification Search
CPC ...... G09G 3/001; H04N 13/351; G06V 10/56; G06V 20/46; G06V 40/20; G06K 9/6267; G06N 3/08; G10L 15/18
See application file for complete search history.

(56) References Cited

U.S. PATENT DOCUMENTS

| | | | |
|---|---|---|---|
| 8,194,923 B2 | 6/2012 | Ramaswamy | |
| 8,910,199 B2 | 12/2014 | Slaney | |
| 9,148,701 B2 | 9/2015 | Craner | |
| 9,161,084 B1 | 10/2015 | Sharma | |
| 10,613,699 B2 | 4/2020 | Thompson | |
| 2014/0240352 A1* | 8/2014 | Kuncl | H04N 21/25841 345/633 |
| 2016/0210100 A1* | 7/2016 | Ng | G06F 3/1423 |
| 2017/0289596 A1 | 10/2017 | Krasadakis | |

* cited by examiner

*Primary Examiner* — Nicholas T Corbo
(74) *Attorney, Agent, or Firm* — Stephanie L. Carusillo (57) ABSTRACT

In an approach for dynamically adjusting parallel reality (PR) displays, a processor configures a viewing event. A processor receives data from data collecting devices located throughout a location of the viewing event. A processor classifies a crowd of the viewing event into at least two partitions using a learning-based neural network that ingests the data. A processor selects content to be displayed to each of the at least two partitions. A processor enables a PR display to simultaneously display the content to each of the at least two partitions.

20 Claims, 4 Drawing Sheets

DYNAMIC ADJUSTMENT OF PARALLEL REALITY DISPLAYS

BACKGROUND OF THE INVENTION

The present invention relates generally to the field of parallel reality displays, and more particularly to dynamic adjustment of parallel reality displays.

Parallel reality displays utilize parallel reality pixels that can simultaneously output up to millions of controllable rays of different colors and brightness, in which each ray can be software-directed to a specific person or specific area, compared to a conventional pixel that can output only a single color at a time. Parallel reality technology enables precision spatial calibration to compute each light ray's destination in dimensional space and high-performance parallel computation by harnessing a network of pixel processors to efficiently coordinate a massive number of light rays in real-time. Parallel reality technology can be combined with additional technologies such as sensors, user interface devices, tracking, machine vision, data management, and predictive analytics.

SUMMARY

Aspects of an embodiment of the present invention disclose a method, computer program product, and computer system for dynamically adjusting parallel reality displays. A processor configures a viewing event. A processor receives data from data collecting devices located throughout a location of the viewing event. A processor classifies a crowd of the viewing event into at least two partitions using a learning-based neural network that ingests the data. A processor selects content to be displayed to each of the at least two partitions. A processor enables a PR display to simultaneously display the content to each of the at least two partitions.

In some aspects of an embodiment of the present invention, a processor configures a type of viewing event, a seating layout of the viewing event, and a relative viewing angle from the PR display for each seat in the seating layout.

In some aspects of an embodiment of the present invention, the data collecting devices include cameras, sensors, and microphones.

In some aspects of an embodiment of the present invention, a processor analyzes a color scheme of the crowd. A processor analyzes audio data received from the data collecting devices using natural language processing to identify crowd chants. A processor analyzes video data received from the data collecting devices using behavioral classification techniques to identify crowd reactions to the viewing event. A processor uses known designated sections as a baseline for classifying the known designated sections into the at least two partitions.

In some aspects of an embodiment of the present invention, a processor classifies a section of the crowd into one of the at least two partitions when a pre-set threshold of audience members of the section is determined to be fans of the same person or team.

In some aspects of an embodiment of the present invention, a processor enables the PR display to simultaneously display the content to each of the at least two partitions using the relative viewing angle for each seat in the at least two partitions.

In some aspects of an embodiment of the present invention, a processor receives feedback from an attendee of the viewing event regarding the content displayed to the attendee.

DETAILED DESCRIPTION

Embodiments of the present invention recognize that sports fans spend billions of dollars annually on their favorite teams and leagues and fan engagement during sporting events ensures this level of spending. Sports stadiums have faced increased competition from advances in home entertainment setups for sports viewing and, as a result, have had to prioritize creating innovative and memorable experiences for fans. In doing so, stadium owners are examining the fan journey and beginning to upgrade various touchpoints to be more seamless, while partnering with service providers to track data that can intelligently shape future enhancements. Since fans spend the majority of their time in seats, it's important for stadiums to capitalize on the spectacle and get fans closer to the game than ever before. Stadiums accomplish this by suspending gigantic display boards above the field. For example, a stadium can feature a 70,000-square-foot double-sided ring display ensuring views of the field from every seat, which helps fans feel more connected to the larger-than-life players on the field. However, the viewing experience is not tailored to individual fans and is not maximizing the experience for fans of both teams.

Embodiments of the present invention recognize that stadiums can leverage cutting-edge Parallel Reality (PR) displays to intelligently customize the experience for as many viewers as possible. A single PR display can simultaneously show tailored content to sections of a crowd in the same environment using the individual pixel technology. Thus, embodiments of the present invention provide a cognitive learning-based system that analyzes inputs from a variety of sensors to dynamically partition crowds in a stadium based on derived audience demographics and deliver personalized content to fans via PR displays. Embodiments of the present invention (1) deliver tailored content via PR displays to subsections of a crowd based on derived audience demographic thresholds; (2) derive audience demographics via color scheme of crowd, compared to known team profiles; (3) partition crowds by demographics via audio inputs, more specifically, using NLP to analyze context of crowd chants or languages; (4) analyze reaction of crowds in comparison to real-time context of an event to derive audience demographics and partition accordingly; (5) use inputs from known designated-fan sections to baseline the demographic analysis; (6) determine angles of display based on micro-location of partitioned crowd sections, relative to PR display location; (7) enable learning-based crowd partitioning via user inputs; (8) corroborate of multi-device demographic analysis of a crowd for personalized delivery of content; and (9) determine PR display outputs based on audience demographics derived from transactional data.

In an example use case, Ben and Jordan enter team A's football stadium to watch team A (home team) play team B (away team), in which the football stadium has a jumbotron PR display viewable by an entire audience in the stadium. Ben and Jordan are fans of team B and are decked out in red and black team B jerseys. Ben and Jordan's seats are located in a section that is primarily team A fans. Embodiments of the present invention utilize data from sensors and cameras around the stadium. Embodiments of the present invention utilize a crowd partitioning neural network engine to determine that Ben and Jordan are fans of team B even though they are in a section of team A's fan based on data from sensors and cameras around the stadium. Embodiments of the present invention can then provide tailored content associated with team B on the jumbotron PR display to Ben and Jordan based on Ben and Jordan's viewing angle while simultaneously providing tailored content associated with team A on the jumbotron PR display to team A's fans around Ben and Jordan based on their viewing angle.

Implementation of embodiments of the invention may take a variety of forms, and exemplary implementation details are discussed subsequently with reference to the Figures.

Figure 1:
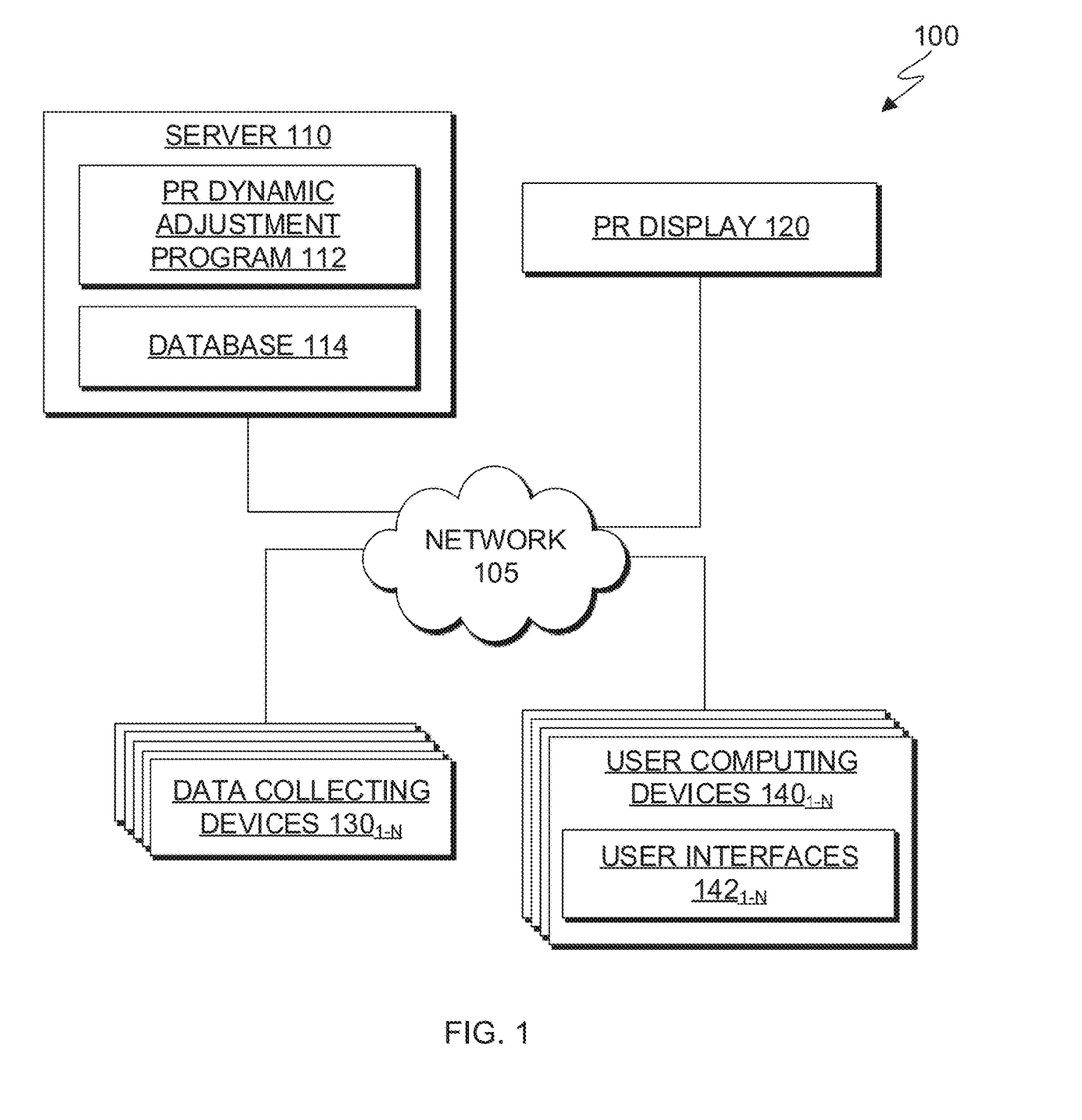
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In an embodiment, distributed data processing environment 100 is a PR display system or a cognitive learning-based system that analyzes inputs from a variety of smart devices to dynamically partition a crowd in a stadium based on derived audience demographics and deliver personalized content to sections of the audience via PR displays. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, PR display 120, data collecting devices $130_{1-N}$, and user computing devices $140_{1-N}$ interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, PR display 120, data collecting devices $130_{1-N}$, user computing devices $140_{1-N}$, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with PR display 120, data collecting devices $130_{1-N}$, user computing devices $140_{1-N}$, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes PR dynamic adjustment program 112 and database 114. Server 110 may include internal and external hardware components, as depicted and described in further detail with respect to FIG. 4.

PR dynamic adjustment program 112 operates to analyze inputs from a variety of smart devices to dynamically partition a crowd in a stadium based on derived audience demographics and deliver personalized content to sections of the audience via PR displays. In an embodiment, PR dynamic adjustment program 112 contains a configuration component, an audience demographics component, a crowd-partitioning engine, and a feedback component. In the depicted embodiment, PR dynamic adjustment program 112 is a standalone program. In another embodiment, PR dynamic adjustment program 112 may be integrated into another software product, such as a software package for a PR display. PR dynamic adjustment program 112 is depicted and described in further detail with respect to FIG. 2 and FIG. 3.

Database 114 operates as a repository for data received, used, and/or output by PR dynamic adjustment program 112. Data received, used, and/or generated may include, but is not limited to, data associated with location of PR display 120 (e.g., basketball arena, concert hall, or football stadium), such as a schedule of events, seating layout (such as, relative viewing angle of PR display for each seat, known section demographics (e.g., home team section, away team section)), type of event, team profiles (i.e., for sporting events, a home team profile and an away team profile, in which team profiles include team colors, mascots, etc.); data collected by data collecting devices $130_{1-N}$ (such as color scheme of crowd's clothing, languages spoken, crowd attention, crowd reactions, context of event, micro-locations of audience members using GPS and/or RFID, relative angle of members of the audience and/or sections of the audience from a PR display); data input by users through user computing devices $140_{1-N}$, i.e., users can opt-in to provide their information and interests (e.g., attendees of a sporting event can provide where they are sitting, which team they're rooting for, a favorite player of theirs, etc.); and any other data received, used, and/or output by PR dynamic adjustment program 112.

Database 114 can be implemented with any type of storage device capable of storing data and configuration files that can be accessed and utilized by server 110, such as a hard disk drive, a database server, or a flash memory. In an embodiment, database 114 is accessed by PR dynamic adjustment program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that PR dynamic adjustment program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. PR dynamic adjustment program 112 enables the authorized and secure processing of personal data.

PR dynamic adjustment program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. PR dynamic adjustment program 112 provides information regarding personal and/or confidential company data and the nature (e.g., type, scope, purpose, duration, etc.) of the processing. PR dynamic adjustment program 112 provides the user with copies of stored personal and/or confidential company data. PR dynamic adjustment program 112 allows the correction or completion of incorrect or incomplete personal and/or confidential company data. PR dynamic adjustment program 112 allows for the immediate deletion of personal and/or confidential company data.

PR display 120 operates as a parallel reality display device utilizing a plurality of PR pixels that can simultaneously output up to millions of controllable rays of different colors and brightness, in which each ray can be software-directed to a specific person or specific area using PR dynamic adjustment program 112. PR display 120 represents one or more PR displays that are operably connected and controlled, at least in part, by PR dynamic adjustment program 112. In an embodiment, PR display 120 is located within a stadium or arena and can be viewed by the entire audience in the stadium or arena, e.g., a football stadium or basketball arena.

Data collecting devices $130_{1-N}$ operate as a plurality of devices collecting data associated with potential viewers of a PR display within a specific location, such as an arena or stadium. Data collecting devices $130_{1-N}$ may include, but are not limited to, sensors, cameras (e.g., 360-degree cameras, eye tracking cameras), and microphones. Data collected by data collecting devices $130_{1-N}$ is sent to server 110, analyzed by PR dynamic adjustment program 112, and stored in database 114. Data collected by data collecting devices $130_{1-N}$ is used to determine how to partition a crowd within the specific location.

User computing devices $140_{1-N}$ operate as computing devices each associated with a user on which the user can interact with PR dynamic adjustment program 112 through an application user interface. In an embodiment, user computing devices $140_{1-N}$ are each associated with a user who has opted-in to PR dynamic adjustment program 112, such as a user who will be a viewer of PR display 120 (e.g., a person in attendance of a sporting event in a stadium with a PR display) or a user looking to display content on PR display 120 (e.g., a marketing manager for a retail company wanting to display advertisements on PR display 120). In the depicted embodiment, user computing devices $140_{1-N}$ each include an instance of user interface 142. In an embodiment, user computing devices $140_{1-N}$ can each be a laptop computer, a tablet computer, a smart phone, a smart watch, an e-reader, smart glasses, wearable computer, or any programmable electronic device capable of communicating with various components and devices within distributed data processing environment 100, via network 105. In general, user computing devices $140_{1-N}$ represent one or more programmable electronic devices or combination of programmable electronic devices capable of executing machine readable program instructions and communicating with other computing devices (not shown) within distributed data processing environment 100 via a network, such as network 105. User computing devices $140_{1-N}$ may include internal and external hardware components, as depicted and described in further detail with respect to FIG. 4.

User interfaces $142_{1-N}$ each provide an interface between PR dynamic adjustment program 112 on server 110 and a respective users of user computing devices $140_{1-N}$. In one embodiment, each instance of user interfaces $142_{1-N}$ is a mobile application software. Mobile application software, or an "app," is a computer program designed to run on smart phones, tablet computers, and other mobile computing devices. In one embodiment, user interfaces $142_{1-N}$ may each be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interfaces $142_{1-N}$ enable respective users of user computing devices $140_{1-N}$ to opt-in to PR dynamic adjustment program 112 and configure user settings. For example, a user may be a content provider interested in displaying advertisements and/or content on PR display 120. In another example, a user may be a member of the audience that can view PR display 120.

Figure 2:
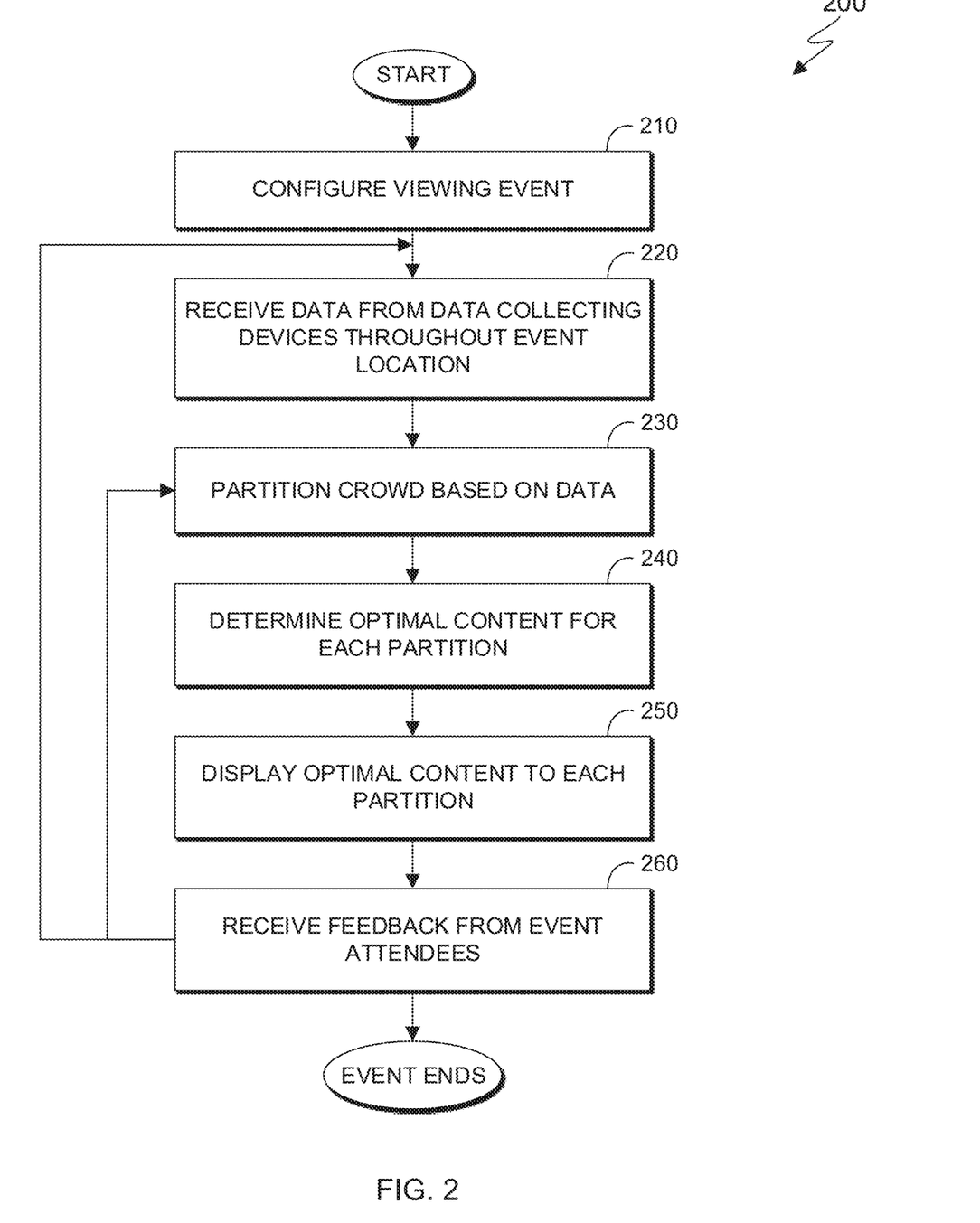
FIG. 2 is a flowchart depicting operational steps of a parallel reality (PR) dynamic adjustment program, for dynamically adjusting parallel reality displays, in accordance with an embodiment of the present invention.

FIG. 2 is a flowchart 200 depicting operational steps of PR dynamic adjustment program 112, for dynamically adjusting PR pixels of a PR display to display personalized content based on crowd-partitioning, in accordance with an embodiment of the present invention. It should be appreciated that the process depicted in FIG. 2 illustrates one possible iteration of PR dynamic adjustment program 112. In some embodiments, once PR dynamic adjustment program 112 configures parameters of an event in step 210, PR dynamic adjustment program 112 repeats steps 220 through 260 as data is received and until the event ends.

In step 210, PR dynamic adjustment program 112 configures a viewing event. In an embodiment, PR dynamic adjustment program 112 configures a viewing event in which a PR display will be utilized. In an embodiment, PR dynamic adjustment program 112 enables a user through a user interface, e.g., user of user computing device $140_1$ through user interface $142_1$, to configure parameters of the viewing event by inputting relevant information. In an embodiment, PR dynamic adjustment program 112 configures a type of viewing event, such as a sporting event, music concert or festival, etc. In an embodiment, PR dynamic adjustment program 112 configures a seating layout of the viewing event and any information associated with the seating layout (i.e., a seating chart with sections, row numbers, and seat numbers for each seat in e.g., a football stadium, and information about designated home team sections and away team sections) and a relative viewing angle from the PR display for each seat. In an embodiment, PR dynamic adjustment program 112 configures other parameters of the viewing event, such as information associated with teams involved in a sporting event (e.g., team colors, team mascot, home team players, and an away team players).

In step 220, PR dynamic adjustment program 112 receives data from data collecting devices throughout event location. In an embodiment, PR dynamic adjustment program 112 continuously receives data from the plurality of data collecting devices, i.e., cameras, sensors, microphones, etc., e.g., data collecting devices $130_{1-N}$, that are located throughout the event location, e.g., a football stadium. In an embodiment, PR dynamic adjustment program 112 receives data from the plurality of data collecting devices at pre-set time intervals throughout the event. In an embodiment, PR dynamic adjustment program 112 stores received data in a database, e.g., database 114.

In step 230, PR dynamic adjustment program 112 partitions crowd based on the received data. In an embodiment, PR dynamic adjustment program 112 partitions a crowd of the event into a plurality of partitions by aggregating and analyzing the received data. For example, PR dynamic adjustment program 112 partitions a crowd of a football game in a stadium into a plurality of partitions based on whether individuals in the crowd are rooting for the home team or the away team. A partition can range from an individual attendee's seat to a section of the crowd including multiple rows of seats to multiple sections of the crowd, or any number of attendee's seats, and PR dynamic adjustment program 112 can determine any number of partitions. For example, section 152 of a football stadium may be designated to home team fans, so the entire section is one partition for home team fans. But if two away team fans end up sitting in section 152 because they bought their tickets from a re-sale website, PR dynamic adjustment program 112 is able to create a partition for these two attendees and designate the partition as an away team fans partition, so section 152 is in a home team fans partition except for these two away team fan attendees that get designated in an away team fan partition.

In an embodiment, PR dynamic adjustment program 112 uses received camera data to analyze a color scheme of subsections of the crowd and identifies whether the color scheme aligns with the home team or the away team. In an embodiment, PR dynamic adjustment program 112 uses natural language processing (NLP) to analyze received audio data for language and/or context of crowd chants in a particular section or area of the crowd. In an embodiment, PR dynamic adjustment program 112 compares camera data of the sporting event and camera data of crowd reactions to compare behaviors of the crowd to context of the sporting event using behavioral classification techniques as known to a person of skill in the art. Based on this comparison, PR dynamic adjustment program 112 analyzes behavioral dynamics of particular sections of the crowd to determine which team a subsection of the crowd, all the way down to individual members of the crowd, is rooting for. In an embodiment, PR dynamic adjustment program 112 uses known designated sections (i.e., designated home team fan sections and designated away team fan sections) as a baseline for the analysis.

Figure 3:
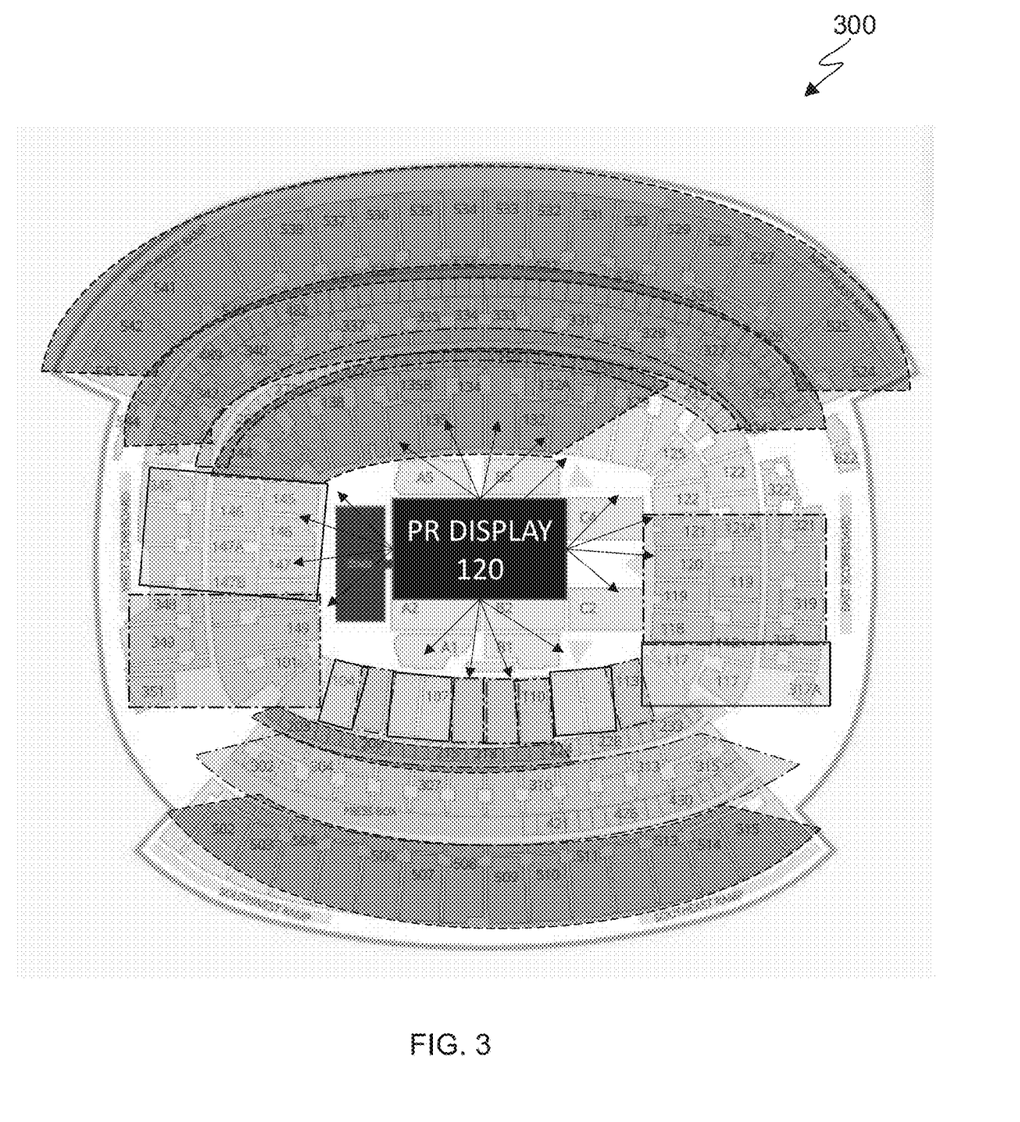
FIG. 3 depicts an example of a heat map produced by the PR dynamic adjustment program, in accordance with an embodiment of the present invention.

In an embodiment, PR dynamic adjustment program 112 classifies and designates specific sections/clusters/partitions of the crowd using a learning-based neural network engine that ingests the received data and creates a heat map of the crowd showing the different partitions. FIG. 3 depicts an example of a heat map 300 produced by PR dynamic adjustment program 112, in accordance with an embodiment of the present invention. In an embodiment, PR dynamic adjustment program 112 partitions the crowd based on the received aggregated data using a weight and threshold model. In an embodiment, PR dynamic adjustment program 112 classifies a section of the crowd into one of the at least two partitions when a pre-set threshold of audience members of the section is determined to be fans of the same person or team. For example, if the percentage of a section of the crowd deemed home team fans is greater than 80%, then that section is designated as home team fans (outlined and colored dark gray in FIG. 3). If the percentage of a section deemed away team fans is greater than 70%, then that section is designated as away team fans (outlined and colored light gray in FIG. 3). If the percentage of a section deemed neutral fans or empty is greater than 50%, then that section is designated as neutral or empty (sections not outlined or colored in FIG. 3).

In step 240, PR dynamic adjustment program 112 selects content for each partition. In an embodiment, PR dynamic adjustment program 112 selects personalized content for each partition of the crowd. In an embodiment, PR dynamic adjustment program 112 selects content for each partition from a set of pre-configured templates, i.e., a template for home team fans showing content/graphics associated with the home team, a template for away team fans showing content/graphics associated with the away team, and a neutral fans template showing content/graphics associated with the game in general. For example, during a football game, if the home team scores a touchdown, a different graphic would be shown to a home fan partition, an away fan partition, and a neutral fan partition.

In step 250, PR dynamic adjustment program 112 enables PR display to display the selected content to each partition. In an embodiment, PR dynamic adjustment program 112 enables the PR display to simultaneously display the selected content to each partition by referencing the heat map and micro-location or relative angle from the PR display ensuring that each attendee sees the personalized content selected for their partition.

In step 260, PR dynamic adjustment program 112 receives feedback from event attendees. In an embodiment, PR dynamic adjustment program 112 enables event attendees, e.g., users of user computing devices $140_{1-N}$, to provide feedback about the quality and relevance of the content displayed to them on through the PR display. PR dynamic adjustment program 112 utilizes the feedback in a reinforcement learning loop to the learning-based neural network engine that partitions the crowd. If PR dynamic adjustment program 112 receives positive feedback, PR dynamic adjustment program 112 inputs the positive feedback as a positive reinforcement in the reinforcement learning loop to the learning-based neural network engine for partitioning the crowd. If PR dynamic adjustment program 112 receives negative feedback, PR dynamic adjustment program 112 analyzes the negative feedback and adjusts the reinforcement learning loop accordingly for the learning-based neural network engine for partitioning the crowd.

Figure 4:
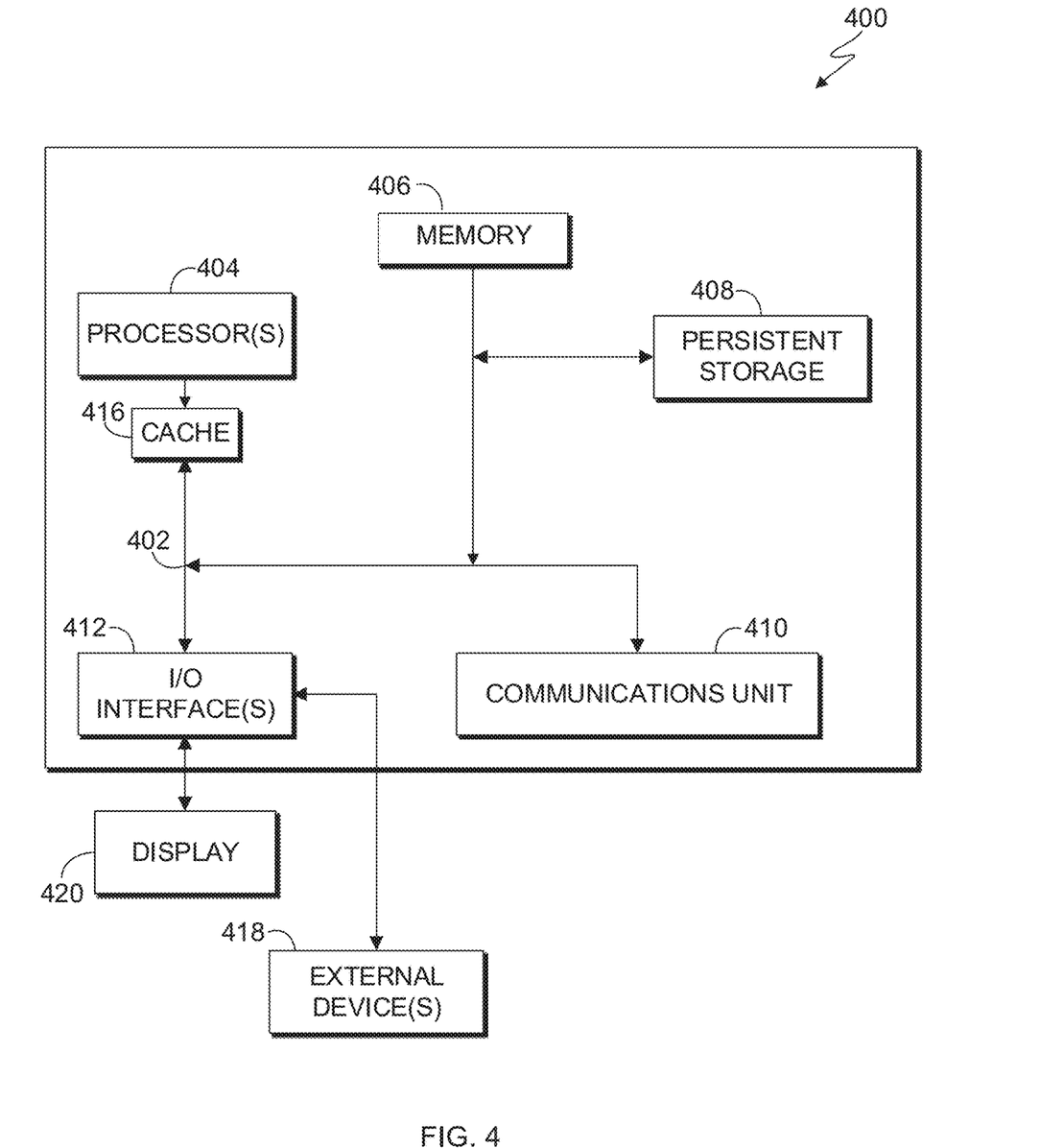
FIG. 4 depicts a block diagram of components of a computing device of the distributed data processing environment of FIG. 1, in accordance with an embodiment of the present invention.

FIG. 4 depicts a block diagram of components of computing device 400, suitable for server 110 and/or user computing devices $140_{1-N}$ within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 110 and/or user computing devices 140$_{1-N}$. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically adjusting parallel reality displays, the computer-implemented method comprising:
    configuring, by one or more processors, a viewing event;
    receiving, by the one or more processors, data from data collecting devices located throughout a location of the viewing event;
    classifying, by the one or more processors, a crowd of the viewing event into at least two partitions using a learning-based neural network that ingests the data, wherein classifying the crowd of the viewing event into the at least two partitions comprises:
        analyzing, by the one or more processors, audio data received from the data collecting devices using natural language processing to identify crowd chants; and
        using, by the one or more processing, known designated sections as a baseline for classifying the known designated sections into the at least two partitions;
    selecting, by the one or more processors, content to be displayed to each of the at least two partitions; and
    enabling, by the one or more processors, a parallel reality (PR) display to simultaneously display the content to each of the at least two partitions.

2. The computer-implemented method of claim 1, wherein configuring the viewing event further comprises:
    configuring, by the one or more processors, a type of viewing event, a seating layout of the viewing event, and a relative viewing angle from the PR display for each seat in the seating layout.

3. The computer-implemented method of claim 1, wherein the data collecting devices include cameras, sensors, and microphones.

4. The computer-implemented method of claim 1, wherein classifying the crowd of the viewing event into the at least two partitions further comprises:
    analyzing, by the one or more processors, a color scheme of the crowd;
    analyzing, by the one or more processors, video data received from the data collecting devices using behavioral classification techniques to identify crowd reactions to the viewing event.

5. The computer-implemented method of claim 1, wherein classifying the crowd of the viewing event into the at least two partitions further comprises:
    classifying, by the one or more processors, a section of the crowd into one of the at least two partitions when a pre-set threshold of audience members of the section is determined to be fans of same person or team.

6. The computer-implemented method of claim 2, wherein enabling the PR display to simultaneously display the content to each of the at least two partitions further comprises:
    enabling, by the one or more processors, the PR display to simultaneously display the content to each of the at least two partitions using the relative viewing angle for each seat in the at least two partitions.

7. The computer-implemented method of claim 1, further comprising:
receiving, by the one or more processors, feedback from an attendee of the viewing event regarding the content displayed to the attendee.

8. A computer program product for dynamically adjusting parallel reality displays, the computer program product comprising:
one or more computer readable storage media and program instructions collectively stored on the one or more computer readable storage media, the stored program instructions comprising:
program instructions to configure a viewing event;
program instructions to receive data from data collecting devices located throughout a location of the viewing event;
program instructions to classify a crowd of the viewing event into at least two partitions using a learning-based neural network that ingests the data, wherein the program instructions to classify the crowd of the viewing event into the at least two partitions comprise:
program instructions to analyze audio data received from the data collecting devices using natural language processing to identify crowd chants; and
program instructions to use known designated sections as a baseline for classifying the known designated sections into the at least two partitions;
program instructions to select content to be displayed to each of the at least two partitions; and
program instructions to enable a parallel reality (PR) display to simultaneously display the content to each of the at least two partitions.

9. The computer program product of claim 8, wherein the program instructions to configure the viewing event further comprise:
program instructions to configure a type of viewing event, a seating layout of the viewing event, and a relative viewing angle from the PR display for each seat in the seating layout.

10. The computer program product of claim 8, wherein the data collecting devices include cameras, sensors, and microphones.

11. The computer program product of claim 8, wherein the program instructions to classify the crowd of the viewing event into the at least two partitions further comprise:
program instructions to analyze a color scheme of the crowd; and
program instructions to analyze video data received from the data collecting devices using behavioral classification techniques to identify crowd reactions to the viewing event.

12. The computer program product of claim 8, wherein the program instructions to classify the crowd of the viewing event into the at least two partitions further comprise:
program instructions to classify a section of the crowd into one of the at least two partitions when a pre-set threshold of audience members of the section is determined to be fans of same person or team.

13. The computer program product of claim 9, wherein the program instructions to enable the PR display to simultaneously display the content to each of the at least two partitions further comprise:
program instructions to enable the PR display to simultaneously display the content to each of the at least two partitions using the relative viewing angle for each seat in the at least two partitions.

14. The computer program product of claim 8, further comprising:
program instructions to receive feedback from an attendee of the viewing event regarding the content displayed to the attendee.

15. A computer system for dynamically adjusting parallel reality displays, the computer system comprising:
one or more computer processors;
one or more computer readable storage media;
program instructions collectively stored on the one or more computer readable storage media for execution by at least one of the one or more computer processors, the stored program instructions comprising:
program instructions to configure a viewing event;
program instructions to receive data from data collecting devices located throughout a location of the viewing event;
program instructions to classify a crowd of the viewing event into at least two partitions using a learning-based neural network that ingests the data, wherein the program instructions to classify the crowd of the viewing event into the at least two partitions comprise:
program instructions to analyze audio data received from the data collecting devices using natural language processing to identify crowd chants; and
program instructions to use known designated sections as a baseline for classifying the known designated sections into the at least two partitions;
program instructions to select content to be displayed to each of the at least two partitions; and
program instructions to enable a parallel reality (PR) display to simultaneously display the content to each of the at least two partitions.

16. The computer system of claim 15, wherein the program instructions to configure the viewing event further comprise:
program instructions to configure a type of viewing event, a seating layout of the viewing event, and a relative viewing angle from the PR display for each seat in the seating layout.

17. The computer system of claim 15, wherein the data collecting devices include cameras, sensors, and microphones.

18. The computer system of claim 15, wherein the program instructions to classify the crowd of the viewing event into the at least two partitions further comprise:
program instructions to analyze a color scheme of the crowd; and
program instructions to analyze video data received from the data collecting devices using behavioral classification techniques to identify crowd reactions to the viewing event.

19. The computer system of claim 15, wherein the program instructions to classify the crowd of the viewing event into the at least two partitions further comprise:
program instructions to classify a section of the crowd into one of the at least two partitions when a pre-set threshold of audience members of the section is determined to be fans of same person or team.

20. The computer system of claim 16, wherein the program instructions to enable the PR display to simultaneously display the content to each of the at least two partitions further comprise:
program instructions to enable the PR display to simultaneously display the content to each of the at least two partitions using the relative viewing angle for each seat in the at least two partitions.

* * * * *